April 15, 1958   J. C. CHUPA   2,830,610
VALVE FOR PLAY BALLS
Filed March 9, 1955

INVENTOR.
JOHN C. CHUPA
BY
Ely, Fryer & Hamilton
ATTORNEYS

_United States Patent Office_

2,830,610
Patented Apr. 15, 1958

2,830,610

VALVE FOR PLAY BALLS

John C. Chupa, Sandusky, Ohio, assignor to The Barr Rubber Products Company, Sandusky, Ohio, a corporation of Ohio Application March 9, 1955, Serial No. 493,139

2 Claims. (Cl. 137—223)

The present invention relates to a valve structure for hollow inflatable play balls and similar objects. More particularly the invention relates to a valve to be used with hollow inflatable objects which are designed to be inflated with an inflating needle.

Heretofore self-sealing valves have been employed in objects designed to be inflated with an inflating needle. Such prior valves consist of rubber or elastic plug structure which is punctured for reception of an inflating needle. When inflation is completed the needle is withdrawn from the plug and the resiliency of the structure causes the puncture to be sealed off.

When a valve of this type, together with the object on which it is mounted, is bounced against any firm surface, the valve may allow a measure of air to escape. As the material from which the plug structure is made loses its initial life and resiliency, leakage upon bouncing becomes more and more pronounced. In this respect the valve may become unsatisfactory for use long before it can no longer function satisfactorily as a closure under static conditions.

Efforts to improve on such valves have led to a variety of elaborations on elemental self-sealing valve structure of the type described above. For example, metal balls which are displaced to one side by the inflating needle have been employed. Pockets containing a fluid seal-off means have been provided. Each elaboration on the basic structure represents additional manufacturing costs and it has long been apparent that it would be highly desirable to avoid such elaborations of the simple elemental valve if some way could be found to avoid the characteristic disadvantages of the elemental valve.

I have provided a valve which accomplishes this object. My valve comprises merely the elemental self-sealing plug of rubber or similar resilient material. However, my valve is designed in a way that enables the valve to effectively retain air even under bouncing impact far more effectively and for a far longer time than conventional elemental self-sealing plugs.

These and other objects and advantages of the invention will be understood more fully from the following description of one specific embodiment of the invention. The description is set forth in connection with the accompanying drawing in which.

Figure 1:
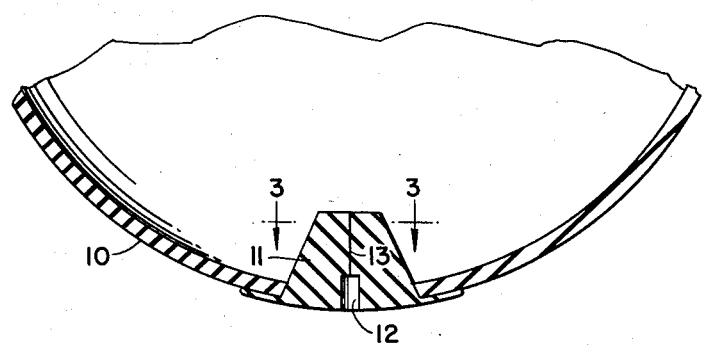
Figure 1 is a sectional view of a valve embodying the invention, the valve being shown fixed to the wall of an inflated object. The inside of the object is above the valve.
Figure 2:
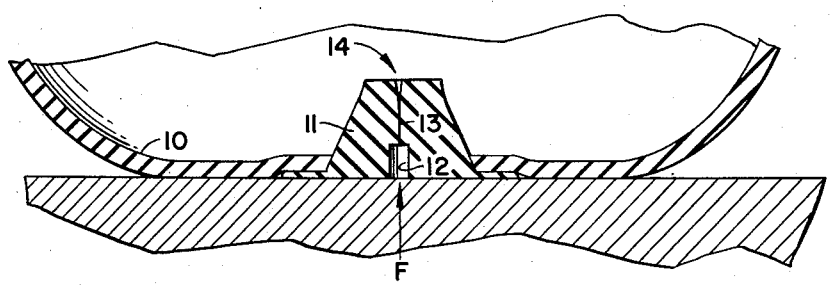
Figure 2 is a view similar to Figure 1 showing the valve during bouncing impact of the valve and the inflated object on which it is mounted against a rigid surface.
Figure 3:
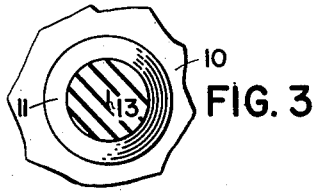
Figure 3 is a section taken on line 3—3 in Figure 1.

To simplify the description and explanation of the invention, use of the terms "up," "upwardly," "below," "down," "horizontal" and "base" are to be understood to refer to such directions with reference to the attitude of the valve shown in Figures 1 and 2. These terms are to be read in the same sense in the appended claims.

Figure 4A:
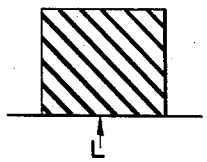
Figures 4 (A–D) are a series of highly schematic illustrations of various plug shapes.
Figure 4B:
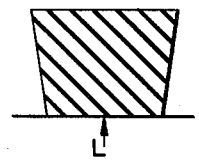
Figure 4C:
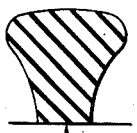
Figure 4D:
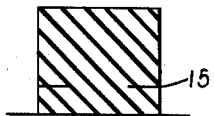

The valve in the drawings is mounted on an envelope and is vulcanized or otherwise appropriately fixed thereto. The valve comprises a generally upwardly tapering body 11. The exact shape of this body is not important, but it is important that there be no deep horizontal peripheral indents, grooves or lines of severance between the bottom of the body and its top. For example, the shapes shown in Figures 4A and 4B would be suitable for the purposes of the invention, but the shapes shown in Figures 4C and 4D would not be suitable. (In Figure 4D, 15 indicates a partial severance between the upper and lower portions of the body.) The upper portions of Figures C and D would play little part in resisting bending loads imposed at L. The shapes of plug to be provided according to the invention can be spoken of in this sense as continuously extending massively from bottom to top and having a non-re-entrant conformation. Such shapes act as beams throughout their height to resist bending loads imposed at L. Such shapes act as beams in every vertical radial plane.

When the valve is subjected to bouncing impact, the momentary impact forces are distributed over the valve body and adjacent portions of the envelope. Under the most severe condition when the valve is at the very center of bouncing impact, the major impact load momentarily occurs at F, as shown in Figure 2, it being understood that progressively decreasing forces are distributed outwardly from this center of impact. In response to these loads, the body 11 acts as a beam and is stressed in horizontal directions under tension in its upper portions and under compression in its lower portions, the intermediate location of no stress or the neutral plane being determined by the height of the center of gravity of the plug.

A bore 12 extends upwardly into the plug body and from the upper end of the bore 12 extends a puncture path 13. I have found that a planar path of severance, as shown, is superior to the usual linear path formed with a puncture needle. The illustrated planar path of severance may be formed with a very narrow pointed blade equal in width to the desired width of the path of severance.

The bore 12 is terminated below the neutral plane of the plug; that is, below the center of gravity of the plug. Accordingly, even under severe impact conditions the valve remains airtight. In fact, the puncture path is more tightly closed than in the static position because at its lower end it is subjected to compressive forces during impact. The spreading of the upper end and consequent leakage which normally tends to occur upon impact becomes particularly troublesome in conventional valves as the valve material dries out and loses its resiliency and life. Under these circumstances the original liveliness of the material can no longer be counted on to maintain an acceptable degree of closure of the puncture path. The relatively great enlargement of the upper end of the puncture path which may occur upon impact, which enlargement may become more pronounced with advancing age of the valve, is indicated at 14 in Figure 2.

The bore 12, terminating as it does below the center of gravity of the plug body, accommodates a certain degree of inward movement of the lower plug material which is under horizontal compression under impact loads. This gives a hinging effect at the upper end of the bore, accentuating the compression-closure of the lower end of the puncture path.

The closure effect is particularly well maintained when the puncture path comprises a narrow plane of severance, as disclosed above, rather than a linear path of severance.

The simplicity of the above valve will be apparent. The valve is no more complex than the most simple valves of the prior art. Yet this valve is more effective in retaining air than are the simple or elemental valves of the prior art and at the same time avoids the costs and complexities of the more elaborate valves of the prior art.

The valve specifically described above illustrates the invention but it will be clear that the invention may be embodied in valve structures differing in detail from the illustrated structure. Accordingly, the invention is not limited in scope to this specifically described valve, but is defined by the following claims.

What is claimed is:

1. A unitary air valve for use with an object to be needle-inflated comprising a plug of elastic material, said plug having a base to be fixed to the wall of the object with which the valve is to be employed, the plug being shaped to continuously extend massively from base to top and having a non-re-entrant conformation, an inner bore extending upwardly from said base, a normally closed puncture path extending from the upper end of said bore to the top of the plug, said bore terminating at its top below the center of gravity of said plug.

2. A unitary air valve for use with an object to be needle-inflated comprising a plug of elastic material, said plug having a base to be fixed to the wall of the object with which the valve is to be employed, the plug being shaped to continuously extend massively from base to top and having a non-re-entrant conformation, an inner bore extending upwardly from said base, a normally closed puncture path extending from the upper end of said bore to the top of the plug, said puncture path comprising a narrow plane of severance, said bore terminating at its top below the center of gravity of said plug.

References Cited in the file of this patent

UNITED STATES PATENTS

| 2,710,623 | Kolos | June 14, 1955 |

FOREIGN PATENTS

| 27,019 | Great Britain | 1898 |
| 426,786 | Great Britain | Apr. 10, 1935 |